United States Patent Office 3,184,322
Patented May 18, 1965

3,184,322
REFRACTORY
Kanaiyalal N. Parikh and Merton L. Van Dreser, San Jose, Calif., assignors to Kaiser Aluminum & Chemical Corporation, Oakland, Calif., a corporation of Delaware
No Drawing. Filed Sept. 7, 1961, Ser. No. 136,437
19 Claims. (Cl. 106—59)

This invention relates to an improved refractory material of non-acid or basic composition; and in a particular manner it relates to an improved bonding composition for non-acid or basic refractories.

Basic refractories have been coming into more widespread use in the production of furnace linings, particularly in high temperature metallurgical furnace installations, and in other uses as well, where their resistance to basic attack is outstanding, and wherein their properties of high strength and refractoriness are particularly desired. In the production of such refractories, as is well known, there is employed a combination of grain material and of bond, the particles of the refractory being sized for best inter-fitting and strongest bonding upon firing. Among the bonding materials which have been proposed in the past there have been magnesia and alumina, in such proportions that, upon firing, magnesium aluminate spinel will be formed. However, the effectuation of such reaction has required relatively high temperatures and substantial periods of time to insure complete reaction and complete maturing of the spinel crystals which are formed. During the reaction to form the spinel, a decrease in specific gravity occurs, leading to a volume increase, which generally amounts to several percent increase above the volume of the dry starting ingredients of the bond. Therefore, without such complete reaction and without complete maturation of the crystals the shaped refractories or refractory masses will exhibit creep or lineal growth or undesirable volume changes, in situ in a furnace.

In forming spinel-bonded refractories, such volume increase occurs in the early stages of firing, followed by later sintering and some shrinkage at higher firing temperatures or at the temperatures of use in many metallurgical furnaces, and this results in undesirably high porosities and weakening resulting from microfractures in the bond or matrix. In forming spinel-bonded refractories, therefore, it has been desired to effect the formation of spinel, or to provide refractory batches which upon firing in situ will form such spinel, in a minimum of time and at lower temperatures, with production of well matured crystals of the spinel and with minimum volume change of the refractory mass in question, in order to maintain the strength of the final fired refractory with a minimum of cracks or other undesired physical defects.

According to the present invention, it has now been found that dense and strong spinel-bonded non-acid or basic refractories are provided by preparing a batch of non-acid grain material with a minor amount of a dry bonding component which consists essentially of finely divided periclase, finely divided alumina exhibiting a specific gravity of from 3.77 to 3.90 and having a malachite green fading time of less than two minutes, the alumina and periclase being in such proportions and adapted to form magnesium aluminate upon firing, and a small amount, up to about 5%, calculated as $TiO_2$, of a titanium compound which upon firing is adapted to form titanium dioxide, or titania. The non-acid grain material is present in such admixture in an amount of over 50%, or a major proportion, whereas the bonding component is present in an amount of less than 50%, or a minor proportion. Preferably the refractory batch will contain from 5% to 20% of the periclase and alumina dry bonding ingredients in spinel proportions.

The basic or neutral grain material which is used in making up the final refractory is a refractory grain material such as periclase, magnesite, chromite or natural or synthetic spinels such as magnesium chromite or magnesium aluminate or admixtures of such materials. Any such grain is useful which is compatible with the magnesia spinel bonding material at the intended service temperature; and preferably such grain contains a minimum amount of low melting impurities such as lime-silica combinations or of components forming low melting compounds with the spinel-forming ingredients of the bond, where very high refractoriness is particularly desired. The grain material is selected in the usual manner as to grain sizes, to provide the desired dense packing in the final product.

The dry bonding materials are finely divided refractory magnesia, for instance, periclase or dead-burned magnesite, finely divided alumina and finely divided titania. These materials are suitably of a size to pass through a 100-mesh screen. The periclase or dead-burned magnesite component is preferably of high purity, that is to say, it preferably contains at least 95% magnesium oxide, not over 2% silicon dioxide, not over 2% calcium oxide and preferably less than 1% thereof. In a preferred embodiment from 50% to 70% of such periclase will pass through a 325-mesh screen.

The finely divided alumina which is employed as dry-bonding component is of a specific gravity from 3.77 to 3.90, preferably from 3.82 to 3.87. The aluminum compound starting material, such as aluminum hydroxide or the like, employed to form such alumina is burned for such time and at such temperature as to provide a product having an average specific gravity within the limits shown. In one mode of operation, aluminum hydroxide or hydrated alumina is heated at about 1200° C. to 1300° C. for not over about 30 minutes to provide alumina of the desired density. As an additional method of determining the suitability of an alumina for use in the present invention, there is employed the so-called "malachite green test" in which a dilute malachite green solution in acetone-methanol is de-colorized by the calcined alumina upon swirling and contact therewith. By this test, which will be described in more detail hereinafter, a suitable alumina will de-colorize the malachite green solution in a period of from 0.1 to 2 minutes contact. The alumina which is employed is preferably low in silica and preferably contains at least 98% aluminum oxide. Suitably it is also low in alkali metal content and preferably does not contain more than 0.5% alkali metal calculated as $Na_2O$.

The titanium oxide which is used can be employed in the form of titania, such as brookite, rutile or anatase, for example, and these materials can be used in the usual commerical technical grades, containing preferably at least 95% titanium dioxide. Other titanium compounds useful herein include titanium oxalate, titanium sulfate, titanium trifluoride and titanium tetrachloride. A small amount of such titania is employed, suitably from 1 to 5%, preferably 1 to 3%, based on total spinel weight of the bond.

Where the coarse material of the batch is periclase grain or an admixture of periclase grains and chromite grains, it is preferred that the finely divided portion of such batch contain from 38% to 50% thereof of the alumina and periclase to form magnesium aluminate upon firing, and at least 50% of finely divided periclase or dead-burned magnesia in excess. In another manner of expressing composition, the magnesium aluminate spinel preferably comprises from about 5.5% to 20% of the total batch weight, on the fired basis. It has been found that the incorporation of the small amount of titania added according to the present invention enables rapid spinel formation at lower temperatures and in shorter times of burning. Furthermore, it has been experience in this art that, when magnesium aluminate spinel is formed in situ at burning temperatures in the previously known manner, the brick containing this bond-forming material will undergo undesirable expansion. It has now been found that incorporation of the titania according to the present invention results in a slight shrinkage upon firing to form spinel, but without any substantial or undesirable volume change of the shaped or other refractory. The incorporation of at least 50% of excess magnesia in the finely divided portion when employing the periclase grain-containing coarser portions, has been found to aid in maintaining and insuring minimum volume change during the firing operation. In the production of cold or chemically-bonded products of such type, it has been found that optimum results are obtained when the finely divided portion contains from 38.5% to 40% of the spinel-forming constituents, on the fired basis, corresponding to 5.75% to 16% of the total batch weight on the fired basis. This composition has been found to provide improved resistance against the action of steel slags and avoids any substantial attack on the lining by formation, in combination with the iron of the slag, of low melting iron aluminate. In preparing chemically-bonded periclase grain containing products according to the present invention, the dry bonding ingredients of this invention are incorporated in the batch and there are also used as chemical bonds any of the known bonding agents of this type, such as magnesium sulfate, magnesium chloride, chromic acid, all of which will form oxysalt or Sorel-type cements in combination with at least a portion of the excess magnesia of the bond, waste sulfite liquor, or other desired chemical bonding agents known to this art. On the other hand, where the coarse material is substantially entirely of chromite grains or spinel grains, it is preferred that the finely divided material of the batch be substantially free of excess periclase, that is, over what is required to form the Mg aluminate spinel and to react with any gangue impurities, such as silica or silicates, normally present in such refractory batches. However, in such batches, or where the coarser material includes alumina grains, it is sometimes advantageous to include in the finely divided portion of the batch chromite, synthetic spinel or alumina particles, the latter being over and above, or in excess of, that required to form the spinel, and is preferably tabular or hard-burned.

It is an advantage of the present invention that the spinel bond is formed in situ at lower cost because of the decreased firing time and the lower burning temperatures which are effective. It is a further advantage that such a bond can be made directly from readily available materials and that the bond exhibits minimum volume change and optimum physical properties. The products made according to the present invention, such as bricks, furnace blocks or linings, exhibit low apparent porosity, high densities, good refractoriness, high modulus of rupture and high hot load strength. More particularly, the products made according to the present invention exhibit chemical neutrality, that is they are resistant to the action of basic or acid slags and are particularly useful in maintaining the life of a refractory lining under the attacks of materials such as steel slags in a steel furnace, carry-over in glass furnace regenerative systems, and the like.

In one preferred mode of carrying out the method of this invention the non-acid grain material which it is desired to use in the refractory, such as magnesite, high purity magnesia, chromite or the like, is admixed with the finely divided periclase, alumina and titania as described herein and this admixture is mixed for two minutes in any desired mixing device generally utilized in this art, such as a muller, this mixing being carried out in the dry state. There is then added to the dry mix a tempering amount of a liquid such as water. For example, there is usually added from 3.5 to 5% of water. It is sometimes advantageous to add any desired chemical bonding agent in solution in such tempering water although such agent can be admixed in dry state with the dry ingredients. For example, magnesium chloride or magnesium sulfate is added in the amounts generally employed in forming chemical bonded refractories, for example, from 0.5 to 2% by weight of such chemical bonding agent based on the weight of the dry batch. The tempered batch is then suitably mixed for 5 to 7 minutes, or in other words, to thoroughly blend the ingredients. The product is then, for example, formed into shapes by pressing in molds under a pressure of from 10,000 to 15,000 p.s.i. The pressed shapes, removed from the molds and are dried, preferably at about 150° C. to form a chemically bonded material, where such product is desired. If desired to pre-bake or pre-fire the bricks, suitably they are fired at 1350° C. in a tunnel kiln in order to form a dense, strong spinel-bonded product.

Bricks or blocks which have been made according to the invention have exhibited excellent life in the checker work or the regenerative system of glass furnaces. Material carried over in the gases from the glass forming furnaces as dust, and eventually deposited on the checker work on the regenerative system, has been found in the prior art to cause severe damage to the bricks of the checkers and frequent cleaning or renewal has been necessary. Any reaction with the dust carryover in such utilization is resisted by the bricks made according to the present invention and there is minimum destruction of the brick by the influence of such dusts, with consequent substantial extension of brick life in such uses. These bricks have also been found to give extended furnace life when used in piers or walls of open hearth furnaces.

The following example will illustrate the mode of operation of this invention.

*Example 1*

A refractory batch is prepared by admixing periclase grain, finely divided alumina, finely divided periclase, finely divided titania and a chemical bonding agent as follows:

| | Percent by weight |
|---|---|
| Periclase, passing 4 mesh and retained on 14 mesh | 42.0 |
| Periclase, passing 14 mesh and retained on 100 mesh | 23.0 |
| Periclase, passing 100 mesh | 20.53 |
| Alumina, passing 100 mesh | 13.10 |
| Titania, passing 100 mesh | 0.36 |
| $MgSO_4$ bonding agent | 1.01 |

The dry ingredients, except the $MgSO_4$ are thoroughly admixed, there is then added 4.21% water as tempering agent in which the $MgSO_4$ is dissolved, and the whole thoroughly blended. The batch A is formed into 9" x 4½" x 3" bricks under 10,000 p.s.i. pressure, and are dried at 150° C. Another batch, B, is made up and pressed in exactly the same way except that no titania is added and instead there was employed a total of 20.89% minus 100 mesh periclase.

The bricks so made are then tested for the following properties, after heating at the temperatures shown for 6 hours and then cooling:

|  | A | B |
|---|---|---|
| Cold Crushing Strength: | | |
| 150° C_____p.s.i__ | 5,900 | 5,400 |
| 850° C_____p.s.i__ | 3,500 | 3,000 |
| 1,350° C_____p.s.i__ | 5,900 | 4,000 |
| 1,600° C_____p.s.i__ | 5,400 | 5,000 |
| Apparent Porosity: | | |
| 150_____percent by Volume__ | 17.1 | 17.1 |
| 1,350_____do____ | 20.5 | 22.2 |
| 1,600_____do____ | 15.3 | 16.0 |
| Bulk Density: | | |
| 150_____Lbs. per cu. ft__ | 176.0 | 175.5 |
| 1,350_____do____ | 175.3 | 172.8 |
| 1,600_____do____ | 186.3 | 184.0 |
| Refractoriness under 25 p.s.i. load, Temperature of Failure_____° C__ | 1,775 | 1,800 |

Pockets 1.5" in diameter and 2" deep were drilled in a brick of batch A and a basic brick now commercially used in glass furnace regenerative structures, in the 4½" x 3" face. A synthetic glass furnace carryover slag of typical composition was prepared by firing the following mixture:

Oxide: Composition, percent by weight slag
$Na_2O$ _____ 12.4
$SiO_2$ _____ 53.5
$CaO$ _____ 34.1

The fired, cooled mixture is finely ground and a sample is charged into each brick pocket and the bricks so treated are heated in a gas-fired periodic kiln to 150° C. above the eutectic temperature or melting point and held for 8 hours at such temperature. Whereas the commercial brick exhibited strong attack by the slag and cracking, the brick according to the invention is practically unaltered. Bricks made according to this invention have exhibited excellent stability and chemical resistance and improved working life when placed in glass furnace regenerative systems.

Example 2

In another example of the present invention, all-chromite grain bricks were prepared. Sized Masinloc chromite grains were thoroughly admixed with finely divided periclase, finely divided alumina and titania. The chromite grains were of sizes to pass 4 mesh down to retained on 100 mesh and the finely divided ingredients were all of a size to pass through a 100-mesh screen. There were added as fines 0.16% $TiO_2$ and 6.04% alumina of 3.88 specific gravity and malachite green de-colorizing time of 2.0 minutes, 2.5% periclase, and these percentages being based on the total weight of the batch. There is then added a tempering amount water, or about 3.25% thereof, containing 0.9% $MgSO_4$ in solution (based on the dry weight of the batch) and the whole thoroughly blended. The batch is then formed into bricks, 9" x 4½" x 3" in size, using 10,000 p.s.i. forming pressure. The bricks are then dried and are burned at 1350° C. Test bricks so made were used to line a portion of the side walls of a circular test hearth, and were heated to 1500° C. in contact with slags obtained from a copper converter and containing considerable amounts of fayalite and magnetite. The remainder of the same side walls in contact with the slag were lined with commercial high chrome refractory brick as normally employed for such use. The erosion of the test brick was substantially less than that of the commercial brick and the test brick was volume-stable and free from swelling as compared with the commercial brick. The chromite bricks made according to the invention and as described in this example are particularly useful in copper-melting furnaces.

Excellent results are obtained when the refractory products of this invention are burned at temperatures as low as 1350° C. but it will be understood that improved results are obtained by this invention when the products are burned or fired at other temperatures also, e.g., 1650° C. It is to be understood that mixtures of the titanium compounds as described above can be employed, if desired. In some operations it is preferred to use as a spinel-forming component, alumina having 3.82 to 3.87 specific gravity and which effects de-colorization of the malachite green solution in from 0.1 to 1.0 minute. The products prepared according to this invention exhibit lower porosities, higher resistance to attack by slags and slight overall volume change during firing. The magnesium aluminate-forming admixture with titanium compound addition as described and with at least 50% excess finely divided periclase is useful per se as a mortar for bonding together periclase grain-containing bricks.

The malachite green test used to determine suitability of alumina for use in the present invention is carried out by preparing a dilute solution in a suitable solvent of the triphenyl methane dye, malachite green oxalate, adding powdered alumina and agitating or swirling and then observing the time required from first contact of the alumina with the solution until the solution is de-colorized. The solvent employed is composed of one volume of acetone admixed with one volume of absolute methanol. There is dissolved in such solvent 80 milligrams per liter of malachite green oxalate (Eastman Organic Chemicals No. 1264), characterized as having a pH of 11.4 to 13. In testing the alumina, 80 milligrams of dried powdered alumina, passing 200 mesh, is placed in a test tube and there is added thereto 1 milliliter of malachite green solution made as described. The mixture is swirled or agitated gently to keep the solids in suspension until the green color disappears and the time required for de-colorization is observed. It has been found that in alumina of the specific gravity defined hereinabove and capable of causing de-colorization of such malachite green solution in from 0.1 to 2 minutes is suitable for formation of magnesium aluminate spinel bond, with the incorporation of titania, according to the present invention.

The screen sizes shown herein are Tyler screen sizes, e.g. 100 mesh corresponds to a mesh opening of 147 microns. Percentages, ratios or parts as expressed herein are by weight, except as to porosity or as otherwise indicated. In conformity with common practice in reporting chemical analyses of refractory and like materials, the amounts of various constituents are given as though these were present as the simple oxides, e.g. $SiO_2$ or $CaO$, although the constituents may actually be present as combinations with other components of the mix, especially after firing. Titania is expressed as a percentage based on the total weight of spinel bond, although in the starting batch the magnesia and alumina will still be present in uncombined state. The titanium compound is added in the mix as described and is in addition to whatever amount of titania or titanium compound which may be present as an impurity in the other starting materials.

Advantageously, in periclase grain-containing mixtures, the finely divided portion of the batch contains at least 50% excess periclase, above that required to form the spinel. Some of such excess periclase may be present after firing in combination with normally occurring impurities.

Having now described the invention, what is claimed is:
1. A refractory batch adapted to provide a dense, spinel-bonded refractory product upon firing and consisting essentially of a major proportion of nonacid grain material compatible with magnesium aluminate and as dry bonding agent a minor proportion of the mixture consisting essentially of finely divided alumina having a specific gravity of from 3.77 to 3.90 and capable of de-colorizing malachite green solution in from 0.1 to 2.0 minutes when 80 milligrams of said alumina are agitated gently with 1 milliliter of a solution containing 80 milligrams per liter of malachite green oxalate, and at least sufficient finely divided periclase to form magnesium aluminate with all of said alumina, said magnesium aluminate constituting from 5% to 20% of the total batch weight on the fired basis, and from 1% to 5% expressed as TiO$_2$ of a finely divided titanium compound adapted to form titania upon firing, based on said magnesium aluminate.

2. A refractory batch adapted to provide a dense, spinel-bonded refractory product upon firing consisting essentially of a major proportion of coarse periclase grain material and a minor proportion of a mixture of finely divided components consisting essentially of alumina of specific gravity from 3.77 to 3.90 and capable of de-colorizing malachite green solution in from 0.1 to 2.0 minutes, when 80 milligrams of said alumina are agitated gently with one milliliter of a solution containing 80 milligrams per liter of malachite green oxalate, sufficient periclase to react with said alumina upon firing to form spinel and to provide excess free periclase, said spinel constituting from 5% to 20% of the total batch weight on the fired basis, and from 1% to 5% titania based on the weight of said spinel.

3. A refractory batch adapted to provide a dense, spinel-bonded refractory product upon firing and consisting essentially of a major proportion of nonacid grain material compatible with magnesium aluminate and from 15% to 40% of dry bonding agent consisting essentially of finely divided alumina having a specific gravity of 3.77 to 3.90 and adapted to cause de-colorizing of a malachite green solution in from 0.1 to 2.0 minutes, when 80 milligrams of said alumina are agitated gently with one milliliter of a solution containing 80 milligrams per liter of malachite green oxalate, and at least sufficient finely divided periclase to form magnesium aluminate with all of said alumina, said magnesium aluminate constituting from 5% to 20% of the total batch weight on the fired basis, and from 1% to 5% of finely divided titania based on the weight of said magnesium aluminate.

4. A refractory batch adapted to provide a dense, spinel-bonded refractory product upon firing and consisting essentially of a major proportion of nonacid grain material compatible with magnesium aluminate and a minor proportion of a finely divided admixture consisting essentially of finely divided alumina having a specific gravity of from 3.77 to 3.90 and adapted to cause de-colorizing of malachite green solution in from 0.1 to 2.0 minutes, when 80 milligrams of said alumina are agitated gently with one milliliter of a solution containing 80 milligrams per liter of malachite green oxalate, and at least sufficient finely divided periclase to form magnesium aluminate with all of said alumina, said magnesium aluminate constituting from 5% to 20% of the total batch weight on the fired basis and from 1% to 5% based on the weight of said magnesium aluminate, of finely divided titania, and a chemical bonding agent.

5. A dense, strong shaped refractory article consisting essentially of a major proportion of nonacid grain material compatible with magnesium aluminate and a minor proportion of a finely divided admixture consisting essentially of finely divided alumina having a specific gravity of from 3.77 to 3.90 and adapted to de-colorize a malachite green solution in from 0.1 to 2.0 minutes when 80 milligrams of said alumina are agitated gently with one milliliter of a solution containing 80 milligrams per liter of malachite green oxalate, at least sufficient finely divided periclase to form magnesium aluminate with all of said alumina, said magnesium aluminate constituting from 5% to 20% of the total weight of the refractory article on the fired basis, and from 1% to 5% finely divided titania, based on said magnesium aluminate.

6. Dense, slag-resistant shaped refractory consisting essentially of a major proportion of coarse magnesia spinel grain material and a minor proportion of a finely divided admixture consisting essentially of alumina having a specific gravity of from 3.77 to 3.90 and adapted to de-colorize malachite green solution in from 0.1 to 2.0 minutes when 80 milligrams of said alumina are agitated gently with one milliliter of a solution containing 80 milligrams per liter of malachite green oxalate, periclase, said alumina being present in at least an amount to react with said periclase upon firing to form magnesium aluminate, said magnesium aluminate constituting from 5% to 20% of the total weight of the refractory on the fired basis, and from 1% to 5% titania based on the weight of said magnesium aluminate.

7. Refractory bonding admixture consisting essentially of finely divided alumina having a specific gravity of 3.77 to 3.90 and adapted to de-colorize malachite green solution in from 0.1 to 2.0 minutes when 80 milligrams of said alumina are agitated gently with one milliliter of a solution containing 80 milligrams per liter of malachite green oxalate, finely divided periclase in an amount to react with all of said alumina to form magnesium aluminate and to provide excess periclase, and from 1% to 5% titania based on the weight of said magnesium aluminate.

8. Dense, slag-resistant shaped refractory consisting essentially of a major proportion of coarse chromite grain material and a minor proportion of a finely divided admixture consisting essentially of alumina having a specific gravity of from 3.77 to 3.90 and adapted to de-colorize malachite green solution in from 0.1 to 2.0 minutes when 80 milligrams of said alumina are agitated gently with one milliliter of a solution containing 80 milligrams per liter of malachite green oxalate, periclase, said alumina being present in at least an amount to react with said periclase upon firing to form magnesium aluminate, said magnesium aluminate constituting from 5% to 20% of the total weight of the refractory on the fired basis, and from 1% to 5% titania based on the weight of said magnesium aluminate.

9. A refractory batch adapted to provide a dense, spinel-bonded refractory product upon firing consisting essentially of a major proportion of an admixture of coarse periclase and chromite grain material and a minor proportion of a mixture of finely divided components consisting essentially of alumina of specific gravity from 3.77 to 3.90 and capable of de-colorizing malachite green solution in from 0.1 to 2.0 minutes when 80 milligrams of said alumina are agitated gently with one milliliter of a solution containing 80 milligrams per liter of malachite green oxalate, sufficient periclase to react with said alumina upon firing to form spinel and to provide excess free periclase, said spinel constituting from 5% to 20% of the total weight of the batch on the fired basis, and from 1% to 5% titania based on the weight of spinel.

10. Process for making a shaped refractory article which comprises preparing an admixture of a major proportion of nonacid grain material compatible with magnesium aluminate and a minor proportion of a dry bonding agent consisting essentially of finely divided periclase, and finely divided alumina of specific gravity from 3.77 to 3.90 grams per cubic centimeter, and capable of de-colorizing a malachite green solution in from 0.1 to 2.0 minutes when 80 milligrams of said alumina are agitated gently with one milliliter of a solution containing 80 milligrams per liter of malachite green oxalate, said alumina and said periclase adapted to react upon firing to form magnesium aluminate, said magnesium aluminate constituting from 5% to 20% of the total weight of the admixture on the fired basis, and from 1% to 5%, based on the total weight of magnesium aluminate, of finely divided titania, adding tempering liquid, forming said mixture into shapes, and firing.

11. Batch as in claim 2 wherein said finely divided mixture contains periclase in an amount to provide at least 50% thereof as excess periclase above that required to form spinel with a finely divided alumina.

12. Refractory batch as in claim 3 containing from 1% to 3% of said titania based on the weight of said magnesium aluminate.

13. Shaped refractory as in claim 5, containing from 1% to 3% of said titania.

14. Shaped refractory as in claim 6 containing from 1% to 3% of said titania based on said magnesium aluminate.

15. Refractory bonding admixture as in claim 7 containing at least 50% excess periclase above that required to form spinel with a finely divided alumina.

16. Shaped refractory as in claim 8 containing 1% to 3% of said titania based on said magnesium aluminate.

17. Batch as in claim 9 wherein said finely divided mixture contains periclase in an amount to provide at least 50% thereof as excess periclase above the amount required to form spinel with the finely divided alumina.

18. Shaped refractory as in claim 5, wherein said finely divided admixture contains at least 50% excess periclase above that required to form spinel with the finely divided alumina.

19. Process as in claim 10 wherein said shapes are formed under pressure.

References Cited by the Examiner

UNITED STATES PATENTS 2,498,622  2/50  Mochel _____ 106—66

FOREIGN PATENTS 517,908  2/40  Great Britain.

TOBIAS E. LEVOW, *Primary Examiner.*

JOHN H. MACK, *Examiner.*